United States Patent [19]

Wohlkonig et al.

[11] 3,925,348
[45] Dec. 9, 1975

[54] AZONAPHTHIMIDAZOLE COMPOUNDS

[75] Inventors: Alexander Wohlkonig, Arlesheim;
Peter Hindermann, Bottmingen;
Fabio Beffa, Riehen; Gert Hegar,
Schonenbuch, all of Switzerland

[73] Assignee: Ciba-Geigy AG, Basel, Switzerland

[22] Filed: Sept. 29, 1972

[21] Appl. No.: 293,632

[30] Foreign Application Priority Data
Oct. 1, 1971   Switzerland.................. 14348/71
Sept. 4, 1972  Switzerland.................. 12983/72

[52] U.S. Cl. ............. 260/157; 260/153; 260/154;
260/155; 260/156; 260/158; 260/160; 260/162
[51] Int. Cl.² ......................................... C09B 29/36
[58] Field of Search............... 260/157, 153, 162

[56] References Cited
UNITED STATES PATENTS

| | | | |
|---|---|---|---|
| 792,600 | 6/1905 | Krekeler et al. | 260/157 |
| 2,829,138 | 4/1958 | Kuster | 260/157 |
| 3,121,712 | 2/1964 | Berrie et al. | 260/146 T |
| 3,125,562 | 3/1964 | Ammann et al. | 260/146 T |
| 3,162,628 | 12/1964 | Berrie et al. | 260/146 T |
| 3,200,108 | 8/1965 | Kremer et al. | 260/157 |

FOREIGN PATENTS OR APPLICATIONS 515,230   1/1931   Germany ........................... 260/162

Primary Examiner—Jiles: Henry R.
Assistant Examiner—Robert W. Ramsuer
Attorney, Agent, or Firm—Joseph G. Kolodny; Edward McC. Roberts; Prabodh I. Almaula

[57] ABSTRACT

New 1H- or 3H-naphtho-(1,2-d)-imidazole dyestuffs of the formula (1)

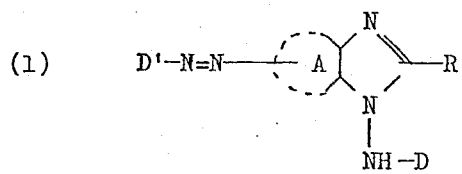

wherein A is the radical of an 8-hydroxynaphthyl-4,6- or -3,6-disulphonic acid, an 8-hydroxynaphthyl-4-, -5- or -6-sulphonic acid, a 5-hydroxynaphthyl-7-sulphonic acid or a 6-hydroxy-naphthyl-8-sulphonic acid or an acid amide derived from these acids, which carries the D'—N=N— group in the o-position to the hydroxyl group, and wherein D and D' represent heterocyclic radicals or radicals of the benzene or naphthalene series and R represents the radical of an aldehyde, and D, D' and R can contain a fibre-reactive or non-fibre-reactive acylamino or azinylamino radical optionally containing sulphonic acid groups, or can contain an $NO_2$ or $NH_2$ group, and the abovementioned sulphonic acid amide group can be monosubstituted or disubstituted such dyestuffs being suitable for dyeing or priority materials such as cellulose, leather, silk, wool, polyamides and urethanes, and are distinguished by their pure shades, generally good light fastness and good general fastness properties.

3 Claims, No Drawings

AZONAPHTHIMIDAZOLE COMPOUNDS

The present invention relates to a process for the manufacture of new valuable azonaphthimidazole compounds which contain a 1H- or 3H-naphtho-(1,2-d)-imidazole grouping and which are outstandingly suitable for dyeing or printing natural or synthetic materials in very pure shades. The new compounds correspond to the formula

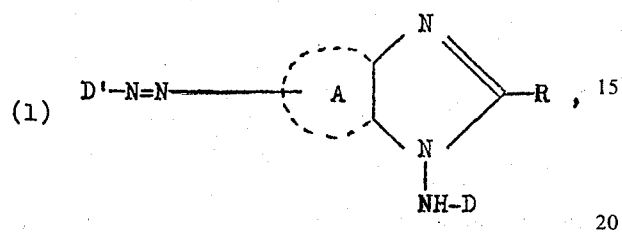

(1)

wherein A is the radical of an 8-hydroxynaphthyl-4,6- or -3,6-disulphonic acid, an 8-hydroxynapthyl-4-, -5- or -6-sulfonic acid, a 5-hydroxynaphthyl-7-sulphonic acid or an acid amide derived from these acids, which carries the D'—N=N— group in the ortho-position to the hydroxyl group, and wherein D and D' represent heterocyclic radicals or radicals of the benzene or naphthalene series and R represents the radical of an aldehyde, and D, D' and R can contain a fibre-reactive or nonfibre-reactive acylamino or azinylamino radical optionally containing sulphonic acid groups, and the abovementioned sulphonic acid amide group can be monosubstituted or disubstituted.

Within the present definition, compounds of practical interest are above all those which correspond to the formulae given below:

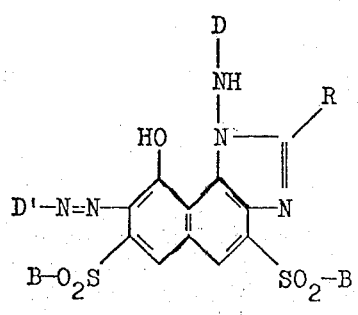

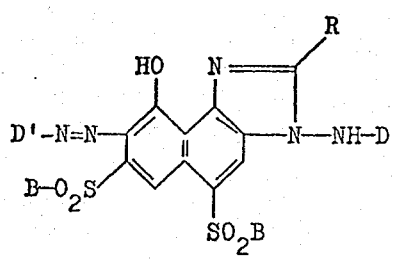

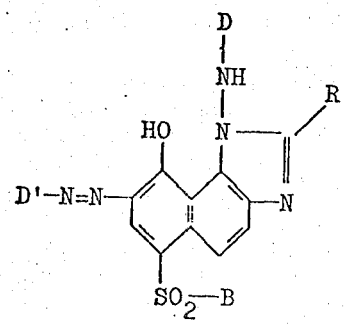

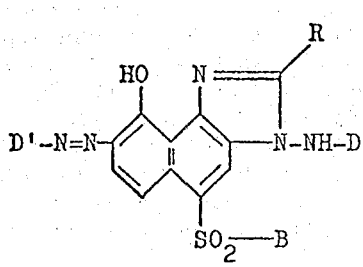

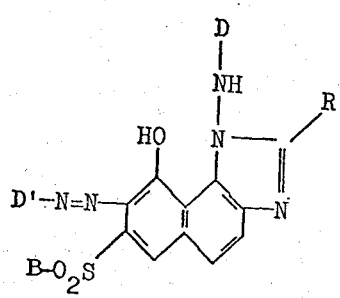

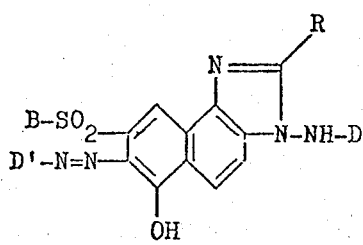

and

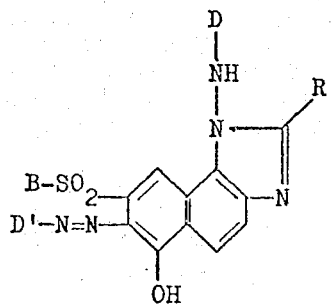

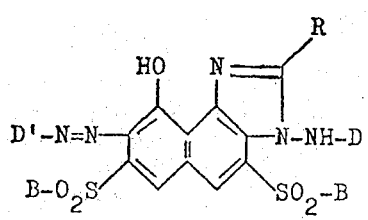

wherein D, D' and R have the abovementioned meaning and wherein B denotes an optionally esterified hydroxyl group or an amino group which can be monosubstituted or disubstituted.

Compounds wherein at least one of the symbols D, D' or R represents a phenyl radical carrying halogen atoms or nitro groups in the o-, m- or p-position, are advantageously chosen.

Particularly valuable dyestuffs are however those wherein at least one of these symbols denotes a radical of the formula

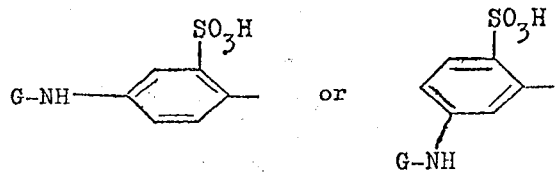

wherein G represents a non-fibre-reactive acyl group, preferably an acetyl, propionyl, benzoyl, aminocarbonyl or aminosulphonyl group or an aryloxy- or alkoxycarbonyl or -sulphonyl group or an aliphatic fibre-reactive acyl radical, such as a chloroacetyl, α,β-dibromopropionyl or α-bromoacrylyl group, or a heterocyclic fibre-reactive radical, such as a halogenated triazinyl or pyrimidyl group.

Though the meanings mentioned above for D, D' and R are of predominant interest, D and D' can also be heterocyclic radicals or unsubstituted or otherwise substituted phenyl radicals, as well as radicals of the naphthalene series, and R can also be an aliphatic or heterocyclic radical.

Sulphonic acid amide groups are also intended to include N-monosubstituted or N,N-disubstituted sulphonic acid amide groups. Possible substituents in such groups are, for example, alkyl radicals, including alkyl radicals which are substituted further, such as, for example, hydroxyalkyl, alkoxyalkyl or cyanoalkyl radicals, cycloalkyl radicals, (cycloalkyl)alkyl radicals, aralkyl radicals, such as, for example, the benzyl or phenylethyl radical and aryl radicals such as, for example, the phenyl, chlorophenyl or methylphenyl radical.

The process according to the invention for the manufacture of these new azonaphthimidazole compounds is characterised in that a diazotised amine of the formula
D'—NH$_2$ (2) 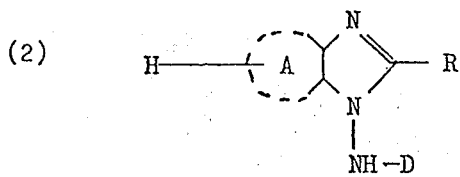

wherein A, D, D' and R have the meaning indicated when explaining the formula (1).

Certain naphthimidazole compounds of the formula (1) used as starting substances have already been mentioned as intermediate products in German Patent Specification 1,081,990. However, there they are not used as coupling components but are reduced to compounds of the formula

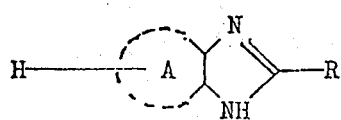

and these are subsequently coupled with a diazo component.

Of course it is also possible, according to the invention, to couple 1 mol of a diazotised diamine of the formula H$_2$N—D'—NH$_2$ or of a coupling component wherein R represents the radical of a dialdehyde or wherein D represents the radical of a diamine, with two mols of a monofunctional coupling component or diazo component, respectively.

The diazotisation of the amine takes place in accordance with methods which are in themselves known, for example with the aid of sodium nitrite and hydrochloric acid. The coupling can also be carried out in a manner which is in itself known, in an acid to alkaline medium.

The naphthimidazole compounds which here serve as starting substances are manufactured in accordance with methods which are in themselves known, by suspending the dyestuff, which is produced by acid coupling of a diazotised amine D—NH$_2$ to a coupling component

in water, acetic acid, alcohol or mixtures thereof, acidifying the suspension with hydrochloric acid and adding a molar amount, or an excess, of an aldehyde R—CHO. The reaction takes place by heating to 70° – 100°C for some hours.

The fibre-reactive grouping which may be present in this naphthimidazole compound can either be introduced into the amine D-NH$_2$ or into the aldehyde R-CHO before the abovementioned coupling or reaction with the aldehyde takes place, or can also be introduced subsequently by acylation of an amino group which can be acylated, with an acid chloride or acid anhydride which donates a fibre-reactive radical.

A further method for the manufacture of the dyestuffs of the formula (1) which possess a fibre-reactive acylamino or azinylamino substituent consists of starting from compounds of the formula (1), wherein, however, at least one of the symbols D, D' and R contains a free NH$_2$ group or a substituent which can be converted into such a group, for example a NO$_2$ group or an acylamino group which is not fibre-reactive, and condensing this free amino group, or the reduced NO$_2$ group or the saponified acylamino group, with an acid chloride or acid anhydride which donates a fibre-reactive radical.

As such chlorides or anhydrides which donate fibre-reactive acyl radicals there may be mentioned those with unsaturated bonds, such as, for example, those of chloromaleic acid, propiolic acid, acrylic acid, α-bromoacrylic acid, α-chloroacrylic acid or α-chlorocrotonic acid, and those with mobile halogen atoms such as, for example, those of chloroacetic acid, sulphochloroacetic acid, β-bromo-, chloro- or α-bromopropionic acid, α,β-dichloro- or dibromo-propionic acid, β-chloro-, β-bromo-, β-sulphato or β-(phenyl-sulphonyl) ethylsulphonic acid and also, for example, 3,5-dinitro-4-chlorobenzoyl chloride, 3,5-dinitro-4-chlorobenzene-sulphonic acid chloride, 2,2,3,3,-tetrafluorocyclobutane-carboxylic or -sulphonic acid chloride, β(2,2,3,3,-tetrafluorocyclobutane)-acrylic acid chloride, vinylsulphonic acid chloride, β-sulphatoethylsulphamic acid chloride, 2-vinylsulphonyl-(2,1,2)-bicycloheptane-5-carboxylic acid chloride and acid chlorides of certain heterocyclic compounds possessing acid character, which contain the labile halogen atom bonded to a heterocyclic ring, that is to say heterocyclic compounds possessing at least two halogen atoms such as, for example, 3,4,5,6-tetrachloropyridazine, 2,4,6-tri- or 2,4,5,6-tetrachloropyrimidine, 5-methyl-2,4,6-trichloropyrimidine, 5-phenyl-2,4,6-trichloropyrimidine, 5-cyano-2,4,6-trichloropyrimidine, 5-nitro-2,4,6-trichloropyrimidine, 5-carbomethoxy-2,4,6-trichloropyrimidine, 5-nitro-2-methyl-4,6-dichloropyrimidine, 5-nitro-6-methyl-2,4-dichloropyrimidine, fluoropyrimidines such as, for example, 2,4-difluoro-5,6-dichloropyrimidine, 2,4,6-trifluoro-5-chloropyrimidine, 4,6-difluoro-2,5-dichloro- or -dibromo-pyrimidines, 2,4,6-trifluoropyrimidines, 2,4-difluoro-5- or -6-methyl-, -phenyl-, -trifluoromethyl-, -cyano-, -chloro-, -carbonamido- or -carbomethoxy-, 5-ethylsulphonyl-, -methylsulphonyl-, -sulphonamido- or -nitro- or 6-bromopyrimidines, 2,4-difluoro-6-methyl-5-chloro- or -bromo-pyrimidines, 2,4-difluoro-6 -chloro-5-nitro- or -methyl-pyrimidines, 2,4-difluoro-5,6-dichloro- or -dibromo-pyrimidines, 2,4-difluoro-6-trifluoromethyl-5-bromo- or -chloropyrimidines, 2,4,5,6-tetrafluoropyrimidines, 2,4,6-trifluoro-5-chloro-, -bromo-, -chloromethyl, -nitro, -cyano, -methyl-, -trifluoromethyl-, -methylsulphonyl, -carbomethoxy, -carboethoxy- or -carbonamido-pyrimidines or 2,4,5-trifluoro-6-methylpyrimidines, 2-methylsulphonyl-4-methyl-6-chloropyrimidine, 2-methylsulphonyl-4-methyl-5,6-dichloropyrimidine, 2,4-dichloropyrimidine-6-carboxylic acid chloride, 2,4,5-trichloropyrimidine-6-carboxylic acid chloride, 2,4-dichloropyrimidine-5-carboxylic acid chloride, 2,4-dichloro-6-methylpyrimidine-5-carboxylic acid chloride, 2,3-dichloroquinoxaline-6-carboxylic or -sulphonic acid chloride, 2,4-dichloroquinazoline-6- or -7-carboxylic acid chloride, 2,4-dichloroquinazoline-6- or -7-sulphonic acid chloride, 1,4-dichlorophthalazine-6-carboxylic or -sulphonic acid chloride, β-[4,5-dichloropyridazonyl-(1)]-propionic acid chloride, the acid chloride of 1-(4'-carboxyphenyl)-4,5-dichloropyridazone-(6), 2-chlorobenzthiazole-6-carboxylic acid chloride or -sulphonic acid chloride, 2-chlorobenoxazole-5-carboxylic or -sulphonic acid chloride and the corresponding bromine derivatives, but above all dihalogenotriazines and trihalogenotriazines, such as cyanuric chloride, 2-methyl-, 2-ethyl- or 2-phenyl-4,6-dichlorotriazine and especially dichlorotriazines of the formula

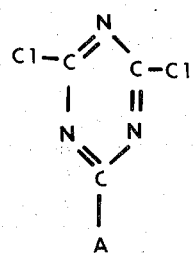

wherein A denotes the radical of a hydroxyl or mercapto compound bonded via the oxygen or sulphur atom respectively, or especially denotes a $NH_2$ group or the radical of an amino compound, bonded via the nitrogen atom, which, if it is aromatic, preferably contains a strongly acid group which confers solubility in water such as, for example, 2-methoxy-4,6-dichloro-s-triazine, 2-ethoxy-4,6-dichloro-s-triazine, 2-phenoxy-4,6-dichloro-s-triazine, 2-mercapto-4,6-dichloro-s-triazine, 2-ethylthio-4,6-dichloro-s-triazine, 2-phenylthio-4,6-dichloro-s-triazine, 2-amino-4,6-dichloro-s-triazine, 2-methylamino-4,6-dichloro-s-triazine, 2-butylamino-4,6-dichloro-s-triazine, 2-diethylamino-4,6-dichloro-s-triazine, 2-β-hydroxyethylamino-4,6-dichloro-s-triazine, 2-β-sulphoethylamino-4,6-dichloro-s-triazine, 2-N-β-sulphatoethyl-N-methylamino-4,6-dichloro-s-triazine, 2-phenylamino-4,6-dichloro-s-triazine, 2-N-methyl-N-phenylamino-4,6-dichloro-s-triazine, 2-(2'-sulphophenylamino)-4,6-dichloro-s-triazine, 2-(2',5'-disulphophenylamino)-4,6-dichloro-s-triazine, 2-(4'-sulphophenoxy)-4,6-dichloro-s-triazine, 2-(4'-carboxyphenoxy)-4,6-dichloro-s-triazine, 2-(4'-sulphophenylthio)-4,6-dichloro-s-triazine, 2-cyclohexylamino-4,6-dichloro-s-triazine and 2-morpholino-4,6-dichloro-s-triazine.

A further modification of the process according to the invention can be used for the manufacture of dyestuffs of the formula (1) which contain, as fibre-reactive substituents, an aliphatic unsaturated grouping of the formula $$-CH=CH-CO-$$

or

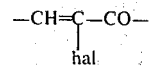

wherein "hal" preferably denotes a chlorine or bromine atom. The process is characterized by starting from the corresponding dyestuffs of the formula (1) wherein at least one of the symbols D, D' and R contains a grouping of the formula

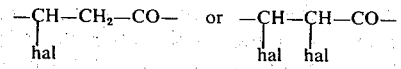

and arriving, from this, at the desired dyestuff by splitting off hydrogen halide. To split off hydrogen halide, the dyestuffs mentioned are appropriately treated with alkali metal hydroxide or carbonate or alkaline earth metal hydroxide or carbonate at low to moderately elevated temperatures.

The dyestuffs of the formula (1) can also be manufactured by reacting a disazo compound of the formula

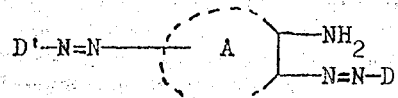

with an aldehyde of the formula R—CHO, with the optionally present fibre-reactive groupings and sulphonamide radicals either already having been introduced or being introduced after this reaction.

As examples of amines $D—NH_2$ or $D'—NH_2$ suitable for the diazotisation and coupling there may be mentioned: aniline and also anilines substituted by chlorine, bromine or nitro, preferably in the o- or p-position such as, for example, 2- or 4-chloroaniline, 2- or 4-bromoaniline, 2- or 4-nitroaniline, 2,4-dichloro-, dibromo- or -dinitre-aniline, 2,5-dichloro- or -dibromo-aniline, 2-chloro- or 2-bromo-4-nitroaniline, 2,6-dichloro-4-nitro-aniline, 2,4-dinitro-6-chloroaniline, 2-chloro-4-cyano- or 2-cyano- or 2-cyano-4-chloro-aniline, 2-chloro-4-methylsulphonyl- or 2-methylsulphonyl-4-chloroaniline, 2-chloro-4-carboethoxy-aniline, 2-carbomethoxy-4-chloroaniline, 2-methyl-4-chloroaniline, 2-trifluoro-methyl-4-chloroaniline, 2,4-dicyano-6-chloroaniline, 2,6-dichloro-4-cyano-aniline, 2,4-dinitro-6-methylsulphonyl-aniline, 2,4-dinitro-5-(2'-hydroxy- or -chloroethylsulphonyl)-aniline, 2-cyano- or 2-carbomethoxy-4-nitroaniline and other compounds which carry substituents such as, for example, nitrile, trifluoromethyl, alkyl, alkoxy, carbalkoxy, alkylsulphonyl, alkoxysulphonyl, arylsulphonyl or aryloxysulphonyl groups or optionally N-monosubstituted or N,N-disubstituted sulphonamide or carbonamide groups such as, for example, 4-methyl-, 4-cyano-, 4- methylsulphonyl- or 4-carbocyclohexyloxyaniline, 2,4- or 2,5-dicyanoaniline, 2-cyano-4-methylsulphonylaniline, 4-methylsulphonyl-2-cyanoaniline and also aniline-2-, -3- or -4-sulphonic acid amide and N-substituted derivatives, such as aniline-2-, -3- or -4-sulphonic acid N-methyl-, N-butyl, N,N-dimethyl-, N,N-diethyl-, N,N-dibutyl-, N-cyclohexyl-, N,γ-isopropoxypropyl-, N-isopropyl-, N,γ-methoxypropyl-, N,N-bis-(β-hydroxyethyl)-, N,N-dimethoxyethyl-, N-ethyl-N-phenyl-, N-methyl-N-cyclohexyl-, N-phenylmethyl- or N,β-methoxyethylamide, aniline-2-, -3- or -4-sulphonic acid N-piperidide, N-morpholide or N-ethyleneimide, aniline-4-nitro-, -4- or -5-chloro-, -4-, -5- or -6-methoxy-, -4,6-dimethyl-, -4- or -6-methyl- or -4-nitro-6-cyano-2-sulphonic acid amide and the corresponding N-substituted derivatives, and also 2-anisidine, 4- or 5-chloro-2-anisidine, 4- or 5-nitro-2-anisidine, 4- or 5-sulpho-2-anisidine, 5-methyl- or 5-methoxy-2-anisidine, 4- or 5-β-hydroxyethylsulphonyl-2-anisidine and also, as suitable heterocyclic compounds, 2-aminopyridine, 2-aminoquiniline, 2-aminobenzthiazole, 2-amino-6-methoxy-benzthiazole, 2-amino-6-nitro-benzthiazole, 3-amino-indazole, 3-amino-6-chloroindazole, 3-amino-6-methoxy-indazole, 7-amino-indazole, 7-amino-4-nitro-indazole, 3-amino-4-phenyl-5-methylpyrazole, 4-amino-benzthiazole, 7-amino-5-chlorobenzimidazole, 4-amino-5-chloro-benzthiazole, 2-aminothiazole, 2-amino-4-methylthiazole, 3-amino-1,2,4-triazole, 5-amino-1,2,4-triazole, 5-amino-2-phenyl-1,3,4-thiadiazole, 5-amino-3-phenyl-1,2,4-thiadiazole, 8-aminoquinoline, 5-chloro-8-aminoquinoline, 5,7-dibromo-8-aminoquinoline, 2-methyl-8-aminoquinoline, 4-aminoacridine, 1-aminocarbazole, 2-amino-5-nitro-thiazole, 5-amino-3-pyridyl-1,2,4-thiadiazole, 2-amino-5-methylthio-1,3,4-thiadiazole, 2-amino-5-ethylthio-1,3,4-thiadiazole, 2-amino-5-phenylthio-1,3,4-thiadiazole, 2-amino-5-cyclohexylthio-1,3,4-thiadiazole, 2-amino-5-methylsulphonyl-1,3,4-thiadiazole, 2-amino-5-methyl-1,3,4-thiadiazole, 2-amino-5-phenylsulphonyl-1,3,4-thiadiazole, 2-amino-5-chloro-1,3,4-thiadiazole, 2-amino-5-carbomethoxyethyl-1,3,4-thiadiazole, 3-amino-2,1-benzisothiazole, 3-amino-5-methyl-2,1-benzisothiazole, 3-amino-4-ethyl-2,1-benzisothiazole, 3-amino-4,7-dimethyl-2,1-benzisothiazole, 3-amino-4-methoxy-2,1-benzisothiazole, 3-amino-5-, -6- or -7-chloro-2,1-benzisothiazole, 3-amino-5,7-dichloro- or -dibromo-2,1-benzisothiazole, 3-amino-4-, -5-, -6- or -7-bromo-2,1-benzisothiazole, 3-amino-5- or -6-cyano-2,1-benzisothiazole, 3-amino-4,6-dichloro-5-cyano-2,1-benzisothiazole, 3-amino-7-chloro-5-cyano-2,1-benzisothiazole, 3-amino-5-chloro-7-cyano-2,1-benzisothiazole, 3-amino-4-methyl-6-cyano-2,1-benzisothiazole, 3-amino-4-, -5-, -6- or -7-nitro-2,1-benzisothiazole, 3-amino-5,7-dinitro-2,1-benzisothiazole, 3-amino-5-nitro-7-chloro-2,1-benzisothiazole, 3-amino-5-nitro-7-bromo-2,1-benzisothiazole, 3-amino-5-(N-methyl-sulphonamido)-2,1-benzisothiazole, 3-amino-5-(N,N-dimethylsulphonamido)-2,1-benzisothiazole, 3-amino-5-methylsulphonyl-2,1-benzisothiazole, and also compounds which possess groups which confer solubility in water and dissociate in water to give an acid reaction, such as SO$_3$H or COOH groups, such as for example, aniline-2-, -3- or -4-sulphonic acid, aniline-2,4- or -2,5-disulphonic acid, aniline-2,4,6-trisulphonic acid, 4-methyl-, 4-chloro-, 4-nitro-, 5-nitro-, 4-methoxy-, 5-fluoro- or 4,6-dimethylaniline-2-sulphonic acid, 4- or 5-acetyl- or -benzoyl-amino-aniline-2-sulphonic acid, 4- or 5-(4'-chlorobenzoylamino)-, 4- or 5-(4'-nitrobenzoyl-amino)-, 4- or 5-methoxycarbonylamino-, 4- or 5-butoxy-carbonylamino-, 4- or 5-methoxyethyloxycarbonylamino- or 4- or 5-chloroacetylamino-aniline-2-sulphonic acid, 6-methylaniline-2,4-disulphonic acid, anthranilic acid, 4- or 5-chloroanthranilic acid, 4- or 5-nitroanthranilic acid, 4- or 5-sulphoanthranilic acid, 4- or 5-β-hydroxyethylsulphonyl- or 5-ethylsulphonylanthranilic acid, anthranilic acid 4-sulphonamide as well as the corresponding substituted amines of the naphthalene series such as, for example, 1- or 2-aminonaphthalene, 1-aminonaphthalene-4-, -5-, -6-, -7- or -8-sulphonic acid, 2-aminonaphthalene-6-sulphonic acid and -sulphonic acid N,γ-isopropoxypropylamide, 2-aminoaphthalene-3-carboxylic acid, 1-aminonaphthalene-2,4-, -3,6-, -3,8- or -4,8-disulphonic acid, 2-aminonaphthalene-4,8- -5,7- or -6,8-disulphonic acid, 2-aminonaphthalene-1,5,7-trisulphonic acid, 1-aminonaphthalene-2,4,8-, -3,6,8- or -4,6,8-trisulphonic acid, 5-aminotriazole-3-carboxylic acid, 8-aminoquinoline-5-sulphonic acid, 2-aminobenzthiazole-6-sulphonic acid, 4- or 5-acetyl- or -benzoyl-aminoaniline-2-sulphonic acid, 4- or 5-(4'-chlorobenzoylamino)-, 4- or 5-(4'-nitrobenzoylamino)-, 4-or 5-methoxycarbonylamino-, 4- or 5-butoxycarbonylamino-, 4- or 5-methoxyethyloxycarbonylamino- or 4- or 5-chloroacetylamino-aniline-2-sulphonic acid.

As examples of compounds of the formula D—NH$_2$ or D'—NH$_2$ which contain a reactive radical there may be mentioned those which contain a vinylsulphonyl radical or a β-chloro, β-dialkylamino-, β-sulphato- or β-thiosulphato-ethylsulphonyl radical as well as those which are obtained by monoacrylation of 1,3-diaminobenzene-4-sulphonic acid, 1,4-diaminobenzene-2-sulphonic acid, 1,4-diaminobenzene-2,5- or -2,6-disulphonic acid, 1,3-diaminobenzene-4,6-disulphonic acid or 2,2-bis(4'-aminophenyl)propane or 1,1-bis(4'-aminophenyl)-cyclohexane with one of the chlorides or anhydrides mentioned earlier, which donate a fibrereactive acyl radical. Such diamines which can be monoacylated are obtainable by reduction of the anilines, containing an NO$_2$ group, which have already been mentioned, or by saponification of amines containing an acylamino radical which is not fibrereactive such as, for example, of 4-acetylamino-2-chloro- or -2-nitroaniline, 4- or 5-acetylaminoanthranilic acid, 4- or 5-ethoxycarbonylamino-aniline-2-sulphonic acid, 4- or 5-methyl- or -ethyl-sulphonylaminoaniline-2-sulphonic acid, 4- or 5-(3',3'-dimethylureyl)-aniline-2-sulphonic acid, 4- or 5-benzoylaminoanthranilic acid, 4- or 5-acetyl- or -benzoylamino-aniline-2-sulphonic acid, 4,β- or 5,β-sulphoethylcarbonylamino-aniline-2-sulphonic acid, 4-benzoylamino-1-aminonaphthalene-3,6-disulphonic acid, 6-acetylamino-2-aminonaphthalene-1,5-disulphonic acid, and some heterocyclic amines such as, for example, 5-acetylamino-8-aminoquinoline, 2-amino-5-acetylamino-1,3,4-thiadiazole, 5-amino-2(4'-aminophenyl)-benzthiazole and 3,3'-diaminocarbanilide.

The following may be mentioned as examples of aldehydes of the formula R—CHO:

Aliphatic aldehydes such as, for example, acetaldehyde, propionaldehyde, n-butylaldehyde, isobutylaldehyde, n-valeraldehyde, hexanealdehyde, n-heptaldehyde and glyoxal.

Aromatic aldehydes, such as, for example, benzaldehyde, m-acetylaminobenzaldehyde, m-nitrobenzaldehyde, benzaldehyde-2-, -3- or -4-sulphonic acid, benzaldehyde-1-carboxylic acid, o-hydroxy-, p-chloro, -nitro- or -hydroxy-benzaldehyde, 2,6-dichlorobenzaldehyde, 4-methoxy-3-amino-benzaldehyde, 6-hydroxy-3-methylbenzaldehyde, 4-dimethylamino-3-nitrobenzaldehyde, 4-dimethylamino-3-nitrobenzaldehyde-6-sulphonic acid, 4-(β-chloroethylsulphonyl)-benzaldehyde, 3- or 4-(α,β-dibromopropionylamino)-benzaldehyde, 3-(4'-methoxy-3'-amino-benzoylamino)-benzaldehyde, cinnamaldehyde, β-(4-amino-phenyl)acrylaldehyde, p-phenyl-benzaldehydes, 1,4-phenylenedialdehyde and 2-phenyl-acetaldehyde.

Heterocyclic aldehydes, such as, for example, 2-furaldehyde.

The dyestuffs obtainable according to the present process and its modifications are new. They are suitable for dyeing or printing the most diverse materials, such as cellulose fibres (cotton), leather, silk and above all wool, and also synthetic fibres such as, for example, polyamides, polyurethanes and the like. If they do not contain any group which confers solubility in water, the dyestuffs according to the invention can be used as pigments or dispersion dyestuffs, for example for dyeing polyester fibres. If they contain an excess of positively charged groupings, such as quaternary ammonium groups, they can be used as cationic dyestuffs, for example for dyeing polyacrylonitrile fibres. Those which contain one or more sulphonic acid groups are above all suitable for application from an acid bath, for example, for dyeing wool or polyamide fibres, and above all also carpets of such fibres. The dyestuffs containing sulphonamide groups are advantageously used from a weakly acid to neutral dye bath. If the dyestuffs contain a fibre-reactive group, they can be employed in the usual manner as reactive dyestuffs for dyeing cellulosic fibres, for example cotton, or also wool, whilst if they do not contain any sulphonic acid groups they can be used as fibre-reactive dispersion dyestuffs for dyeing, for example, polyester fibres.

The dyeings and prints obtained with the new dyestuffs from a neutral or acid bath are distinguished by outstandingly pure shades, generally good light fastness and good general fastness properties. The dyestuffs furthermore possess good build-up capacity.

In the examples which follow, the parts, unless otherwise stated denote parts by weight and the percentages denote percentages by weight.

EXAMPLE 1

23 parts of 5-acetylamino-aminobenzene-2-sulphonic acid are dissolved in 600 parts of water, with addition of sodium carbonate, and after addition of 20 parts by volume of a 5 N sodium nitrite solution, the solution is mixed with 40 parts by volume of 30% strength hydrochloric acid at 0° to 5°C. The diazonium compound thereby obtained is added to 42.5 parts of 1-(2'-chlorophenylamino)-9-hydroxy-2-methyl-1H-naphtho(1,2-d)imidazole-7-sulphonic acid in 500 parts of water and the suspension is rendered alkaline with sodium carbonate solution. After completion of coupling, the solution is heated and the dyestuff of the formula

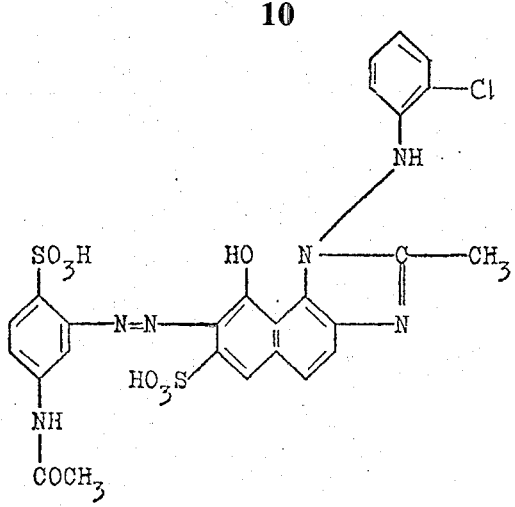

is precipitated by adding sodium chloride and filtered off. After drying, the dyestuff is a dark powder which dyes polyamide fibres and wool, from a bath containing acetic acid, in pure red shades having generally good fastness properties and very good fastness to light.

To manufacture the 1-(2'-chlorophenylamino)-9-hydroxy-2-methyl-1H-naphtho(1,2-d)-imidazole-7-sulphonic acid used in this example, the dyestuff obtained by acid coupling of diazotised o-chloroaniline with 2-amino-8-hydroxy-naphthalene-6-sulphonic acid is suspended in water or an alcohol-water mixture the mixture is acidified with hydrochloric acid and a molar amount, or an excess, of acetaldehyde is added. Thereafter the mixture is heated to 80°– 100°C for some hours and the product which has precipitated is filtered off, washed and dried. After reprecipitation from alcohol/water, colourless crystals are obtained.

If, following the instructions of Example 1, the diazotised amines of the formula (1)

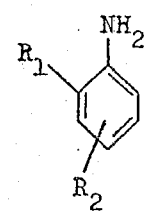

(1)

wherein $R_1$ and $R_2$ have the meanings indicated in columns I and II of the table below, are coupled with the coupling components of the formula (2)

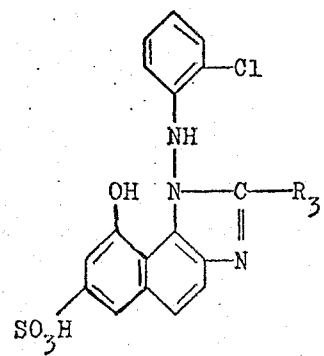

wherein $R_3$ has the meaning indicated in column III, dyestuffs are obtained which dye polyamide fibres and wool in the shades indicated in column IV.

Table I

| No. | (I) $R_1$ | (II) Bluish-tinged 2 | (III) $R_3$ | (IV) Shade |
|---|---|---|---|---|
| 1 | $SO_3H$ | 5-$NHCOC_6H_5$ | $CH_3$ | Scarlet |
| 2 | $SO_3H$ | 5-$NHCOC_6H_4Cl(p)$ | $CH_3$ | " |
| 3 | $SO_3H$ | 5-$NHCOC_6H_4NO_2(p)$ | $CH_3$ | " |
| 4 | $SO_3H$ | 5-$NHCOOCH_3$ | $CH_3$ | " |
| 5 | $SO_3H$ | 5-$NHCOOC_4H_9$ | $CH_3$ | " |
| 6 | $SO_3H$ | 5-$NHCOOCH_2CH_2OCH_3$ | $CH_3$ | " |
| 7 | $SO_3H$ | 4-$NHCOCH_3$ | $CH_3$ | Bluish-tinged red |
| 8 | $SO_3H$ | H | $CH_3$ | Scarlet |
| 9 | $SO_2C_6H_5$ | H | $CH_3$ | Scarlet |
| 10 | $SO_3H$ | 5-$NHCOCH_3$ | $CH_2C_6H_5$ | Red |
| 11 | $SO_3H$ | 5-$NHCOC_6H_5$ | $CH_2C_6H_5$ | " |
| 12 | $SO_3H$ | 5-$NHCOCH_3$ | $C_6H_5$ | " |
| 13 | $SO_3H$ | 5-$NHCOC_6H_5$ | $C_6H_5$ | " |
| 14 | $SO_3H$ | 5-$NHCOCH_2Cl$ | $CH_3$ | Scarlet |
| 15 | $OCH_3$ | H | $CH_3$ | Bluish-tinged red |
| 16 | $CH_3$ | H | $CH_3$ | Red |
| 17 | H | H | $CH_3$ | " |
| 18 | Cl | H | $CH_3$ | " |
| 19 | H | 3-$SO_3H$ | $CH_3$ | " |
| 20 | H | 4-$SO_3H$ | $CH_3$ | " |
| 21 | Cl | H | $C_6H_5$ | " |
| 22 | Cl | H | Furfuryl-(2) | " |
| 23 | H | H | $C_6H_5$ | " |
| 24 | H | H | Furfuryl-(2) | " |
| 25 | $SO_3H$ | H | $C_6H_5$ | " |
| 26 | H | 3-$SO_3H$ | $C_6H_5$ | " |
| 27 | H | 4-$SO_3H$ | $C_6H_5$ | " |
| 28 | $SO_3H$ | H | Furfuryl-(2) | " |
| 29 | H | 3-$SO_3H$ | Furfuryl-(2) | " |
| 30 | H | 4-$SO_3H$ | Furfuryl-(2) | " |
| 31 | $SO_3H$ | 5-$NHCOCH_3$ | $C_2H_5$ | " |
| 32 | $SO_3H$ | 5-$NHCOC_6H_5$ | $C_2H_5$ | " |
| 33 | $SO_3H$ | 5-$NHCOCH_3$ | $CH_2CH_2CH_3$ | " |
| 34 | $SO_3H$ | 5-$NHCOC_6H_5$ | $CH_2CH_2CH_3$ | " |
| 35 | $SO_3H$ | 5-$NHCOCH_3$ | $CH_2CH_2CH_2CH_2CH_3$ | Red |
| 36 | $SO_3H$ | 5-$NHCOC_6H_5$ | $CH_2CH_2CH_2CH_2CH_3$ | " |
| 37 | $SO_3H$ | 5-F | $CH_3$ | " |
| 38 | $SO_3H$ | 4-$NHSO_2CH_3$ | $CH_3$ | " |
| 39 | $SO_3H$ | 4-$NHCOC_2H_4OH$ | $CH_3$ | " |
| 40 | COOH | 4-$SO_3H$ | $CH_3$ | " |
| 41 | $SO_3H$ | 5-$NHCOCH_3$ | n-$C_7H_{15}$ | Scarlet |
| 42 | " | " | n-$C_8H_{19}$ | " |
| 43 | " | " | $C_6H_{11}$ | " |
| 44 | " | 5-$NHCOC_6H_5$ | n-$C_7H_{15}$ | " |
| 45 | " | " | n-$C_9H_{19}$ | " |
| 46 | " | " | $C_6H_{11}$ | " |
| 47 | " | " | n-$C_4H_9$ | " |
| 48 | " | " | iSO-$C_4H_9$ | " |
| 49 | " | " | | " |
| 50 | " | " | n-$C_6H_{13}$ | " |
| 51 | " | " | n-$C_8H_{17}$ | " |
| 52 | " | " | iSO-$C_3H_7$ | " |

If, in Example 1, the 5-acetylamino-aminobenzene-2-sulphonic acid is replaced by a corresponding amount of 2-aminonaphthalene-1-sulphonic acid or 2-aminonaphthalene-6-sulphonic acid and in other respects the abovementioned instructions are followed, dyestuffs are obtained which dey wool and polyamide fibres in red shades.

EXAMPLE 2

40.2 parts of 5-($\alpha,\beta$-dibromopropionylamino)-amino-benzene-2-sulphonic acid are dissolved in 600 parts of water with addition of sodium carbonate, the solution is treated with 30 parts by volume of 30% strength hydrochloric acid at 0° to 5°C and the resulting compound is diazotised with 20 by volume of 5 N sodium nitrite solution. The diazo suspension is thereafter added to 40.3 parts of 1-(2'-chlorophenylamino)-9-hydroxy-2-methyl-1H-naphtho(1,2-d)-imidazole-7-sulphonic acid, dissolved in 500 parts of water with addition of caustic alkali solution, and the mixture is adjusted to $p_H$ 6.5 with sodium carbonate solution. After completion of coupling, the dyestuff formed, of the formula

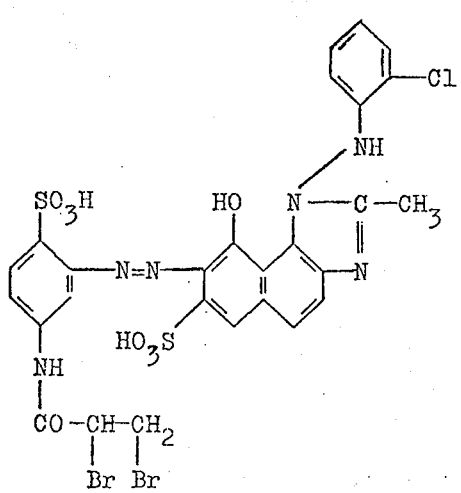

is precipitated with sodium chloride, filtered off and dried in vacuo at 60° to 70°C. It dyes wool in pure red shades of good fastness properties, especially of very good fastness to light.

If the abovementioned dyestuff, after completion of coupling but before filtration, is treated with 30% strength sodium hydroxide solution at 0° – 5°C until the solution has reached a pH value of 12, and the mixture is stirred at this temperature and at this pH value for 30 minutes, and in other respects the above instructions are followed, a dyestuff having the same properties is obtained.

If, following the instructions of Example 2, the diazotised amines of the formula (1):

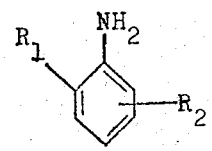

(1)

wherein $R_1$ and $R_2$ have the meanings indicated in columns I and II of the table which follows, are coupled with the coupling components of the formula (2)

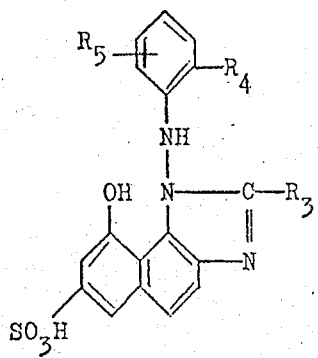

(2)

wherein $R_3$, $R_4$ and $R_5$ have the meaning indicated in column III, IV and V, dyestuffs are obtained which dye wool in the shades indicated in column VI.

added at 0°C. The mixture is stirred at 0° – 5°C whilst maintaining a pH value of 6 – 7 by addition of 2 N sodium hydroxide solution, until a clear solution has been produced. 7 parts of sodium nitrite are now added and the resulting solution is poured into a mixture of 100 parts of ice and 25 parts of 32 per cent strength hydrochloric acid. The resulting diazo solution is run into a solution of 52,9 parts of 1-(2′,5′-disulphophenylamino)-9-hydroxy-2-methyl-1H-naphthol(1,2-)imidazole-7-sulphonic acid in water whilst stirring at pH 7 – 7.5. After completion of coupling, the dyestuff of the formula

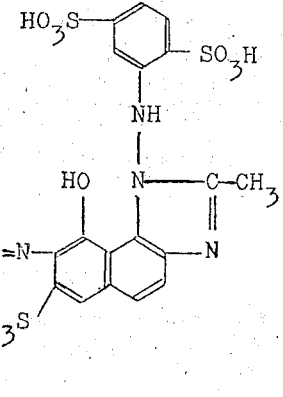

is precipitated from the deep red dyestuff solution by adding sodium chloride. It contains 2 reactive chlorine atoms per molecule and dyes cotton in fast strongly bluish-tinged red shades. If after completion of coupling, instead of salting out, 25 parts by volume of concentrated aqueous ammonia solution are added and the mixture is stirred for 3 hours at 35°C, a dyestuff is obtained after salting out which again dyes cotton in bluish-tinged red shades. If instead of 1,4-phenylene-dia- Table II

| No. | (I) $R_1$ | (II) $R_2$ | (III) $R_3$ | (IV) $R_4$ | (V) $R_5$ | (VI) Shade |
|---|---|---|---|---|---|---|
| 1 | $SO_3H$ | 5-(2,6-Difluoro-5-chloro-pyrimidin-(4-yl-amino-) | $CH_3$ | Cl | H | Scarlet |
| 2 | $SO_3H$ | 5-NHCOCHBrCH$_2$Br | $CH_3$ | $NO_2$ | H | " |
| 3 | $SO_3H$ | " | $CH_3$ | | H | " |
| 4 | $SO_3H$ | " | $CH_3$ | | H | " |
| 5 | $SO_3H$ | " | $CH_3$ | 4-$NO_2$ | | " |
| 6 | $SO_3H$ | " | $C_6H_5$ | | H | Red |
| 7 | $SO_3H$ | " | Furfuryl-(2) | | H | " |
| 8 | $SO_3H$ | " | $CH_3$ | $SO_3H$ | H | Scarlet |
| 9 | $SO_3H$ | H | $C_6H_4$—NHCOCH—BrCH$_2$Br(M) | Cl | H | Red |
| 10 | $SO_3H$ | 5-NHCOCHBrCH$_2$Br | $CH_3$ | $SO_3H$ | 5-NHCOCH—BrCH$_2$Br | Scarlet |
| 11 | $SO_3H$ | 4-NHCOCHBrCH$_2$Br | $CH_3$ | $SO_3H$ | " | " |
| 12 | $SO_3H$ | " | $C_6H_4NO_2$(m) | $SO_3H$ | " | Violet |
| 13 | $SO_3H$ | 5-NHCOCHBrCH$_2$Br | $C_6H_4NO_2$(p) | $SO_3H$ | 5-NHCOCH—BrCH$_2$Br | Violet |
| 14 | $SO_3H$ | " | $C_6H_4NO_2$(m) | $SO_3H$ | " | " |
| 15 | $SO_3H$ | 4-NHCOCHBrCH$_2$Br | $C_6H_4NO_2$(p) | $SO_3H$ | " | " |
| 16 | $SO_3H$ | 5-NHCOCHBrCH$_2$Br | $CH_3$ | $SO_3H$ | 4-NHCOCHBrCH$_2$Br | Scarlet |
| 17 | $SO_3H$ | " | $CH_2$—NHCOCHBr—CH$_2$Br | Cl | H | " |
| 18 | $SO_3H$ | " | $CH_2$—NHCOCH$_2$Cl | Cl | H | " |

EXAMPLE 3

26.8 parts of 1,4-phenylenediamine-2,5-disulphonic acid are dissolved in water at pH 7 and a solution of 18.5 parts of cyanuric chloride in 50 parts of acetone is mine-2,5-disulphonic acid in diamines indicated in Table III below, column (I) are used and condensation is carried out with the reactive acylating agents [column (III) of Table III], further dyestuffs which dye cotton in red shades are obtained.

Table III

| No. | (I) Diamine | (II) Acrylating agent | (III) Coupling component |
|---|---|---|---|
| 1 | 1,3-Phenylenediamine-4-sulphonic acid | 2,4-Dichloro-6-methoxy-1,3,5-triazine | 1-(2'-Sulphophenylamino)-9-hydroxy-2-methyl-naphtho(1,2-d)imidazole-7-sulphonic acid |
| 2 | " | 2-(2',5'-Disulphophenyl-amino)-4,6-dichloro-1,3,5-triazine | " |
| 3 | 1,3-Phenylenediamine-4,6-disulphonic acid | 2,4,5,6-Tetrachloro-pyrimidine | " |
| 4 | " | 2,4-Dichloropyrimidine-5-carboxylic acid chloride | " |
| 5 | " | 2,3-Dichloroquinoxaline-6-carboxylic acid chloride | " |
| 6 | 1,4-Phenylenediamine-2-sulphonic acid | 2-Methyl-4,6-dichloro-1,3,5-triazine | 1-(2',4'-Disulphophenylamino)-9-hydroxy-2-phenylnaphtho(1,2-d)-imidazole-7-sulphonic acid |
| 7 | " | 2-(3'-Sulphophenylamino)-4,6-dichloro-1,3,5-triazine | 1-(3'-Sulphophenylamino)-9-hydroxy-2-ethyl-naphtho(1,2-d)imidazole-7-sulphonic acid |
| 8 | 1,3-Phenylenediamine-4-sulphonic acid | 2-Amino-4,6-dichloro-1,3,5-triazine | 1-(2'-Sulphophenylamino)-9-hydroxy-2-methyl-naphtho(1,2-d)imidazole-8-sulphonic acid |
| 9 | 1,3-Phenylenediamine-4-sulphonic acid | 2-Isopropoxy-4,6-dichloro-1,3,5-triazine | 1-(2'-Sulphophenylamino)-6-hydroxy-2-methyl-naphtho(1,2-d)imidazole-8-sulphonic acid |
| 10 | 1,3-Phenylenediamine-4-sulphonic acid | 2-Isopropoxy-4,6-dichloro-1,3,5-triazine | 1-(2',5'-Disulphophenylamino)-6-hydroxy-2-methyl-naphtho(1,2-d)imidazole-8-sulphonic acid |
| 11 | " | 2,4,5,6-Tetrafluoropyrimidine | " |
| 12 | 1,3-Phenylenediamine-4,6-disulphonic acid | 5-Cyano-2,4,6-trichloro-pyrimidine | " |

EXAMPLE 4

A solution of 18.5 parts of cyanuric chloride in 50 parts of acetone is added at 0°C to an aqueous solution of 50.7 parts of the disodium salt of 1-(3'-amino-phenylamino)-2-methyl-9-hydroxy-naphtho(1,2-d)imidazole-2',7-disulphonic acid and condensation is carried out at the indicated temperature whilst maintaining a pH value of 6–7 by dropwise addition of 2 N sodium hydroxide solution. After completion of condensation, a diazo solution manufactured in the usual manner from 20.3 parts of 4-amino-anisole-3-sulphonic acid is added and coupling is carried out at pH 7 to 7.5. When no further diazo compound is detectable, 25 parts by volume of concentrated aqueous ammonia are added and the mixture is stirred for 3 hours at 40°C. Thereafter the dyestuff of the formula

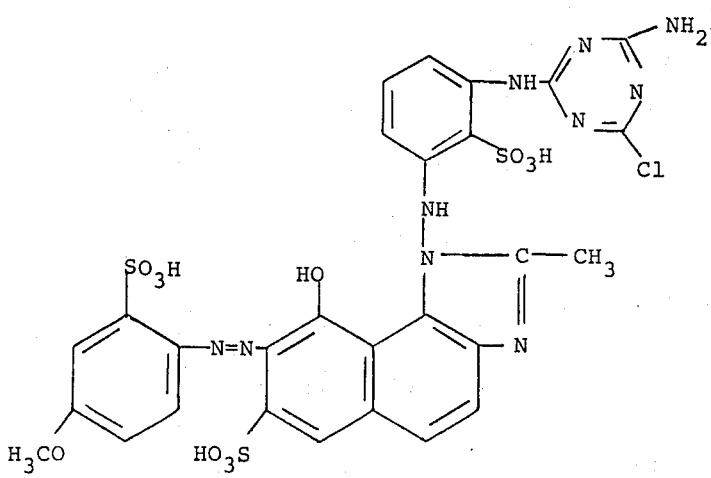

is salted out by adding sodium chloride. It dyes textile material of cellulose fibres in fast red shades. Similar dyestuffs are obtained if instead of ammonia equivalent amounts of methylamine, diethylamine or morpholine are used.

If after completion of coupling, instead of adding ammonia, an aqueous solution of 5.4 parts of 1,3- or 1,4-phenylenediamine is added and condensation is carried out at 30° – 40°C and a pH value of 6-7, dyestuffs having similar properties are obtained.

EXAMPLE 5

17.3 parts of metanilic acid are condensed with cyanuric chloride in the usual manner. An aqueous solution of 20.8 parts of the sodium salt of 1,3-phenylenediamine-4-sulphonic acid is added to the condensation product obtained and condensation is carried out at 20°–25°C and a pH value of 6–7. When no further 1,3-phenylenediamine-4-sulphonic acid is detectable the mixture is cooled to 0°C and a solution of 18.5 parts of cyanuric chloride in 50 parts of acetone is added. During the condensation, the pH value of the solution is kept at 6–7 by dropwise addition of 2 N sodium hydroxide solution. After completion of the condensation, a solution of 80 parts of the dyestuff of the formula

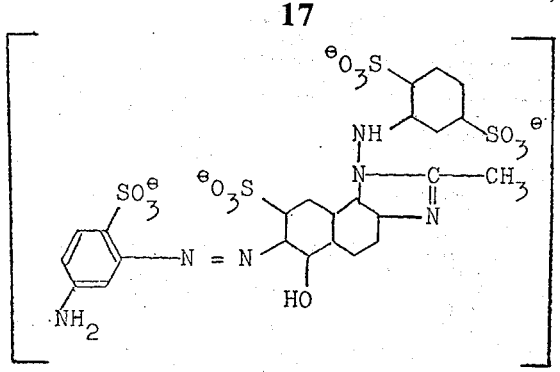

in 400 parts by volume of water is added, the mixture is warmed to 40°C and condensation is carried out at pH 6–7. After completion of condensation, the bi-reactive dyestuff is salted out, filtered off and dried. It dyes cotton in fast pure red shades.

EXAMPLE 6

29.2 parts of 5-benzoylamino-aminobenzene-2-sulphonic acid are dissolved in 500 parts by volume of water with addition of sodium carbonate, the solution is mixed with 20 parts by volume of 5 N sodium nitrite solution and cooled to 0° – 5°C and 40 parts by volume of 30% strength hydrochloric acid are added all at once. Thereafter the yellow diazo suspension is added to 41.4 parts of 1-(4'-nitrophenyl-amino)-9-hydroxy-2-methyl-naphtho(1,2-d)imidazole-7-sulphonic acid dissolved in 500 parts by volume of water and 43 parts of sodium carbonate. After completion of coupling, the dyestuff which has precipitated, of the formula

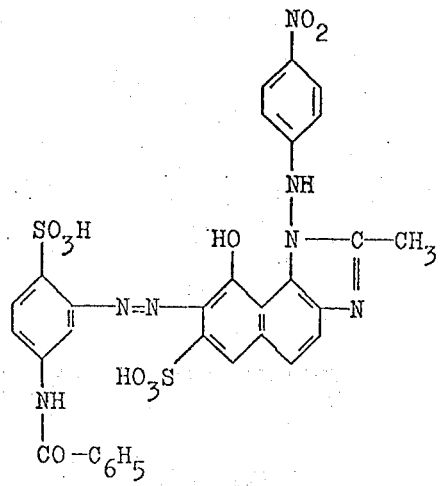

is filtered off, washed with sodium chloride solution (2% strength) and dried. It dyes wool and polyamide fibres, from a bath containing acetic acid, to give pure red shades having very good fastness properties.

If, following the instructions of Example 6, the diazotised amines of the formula (1)

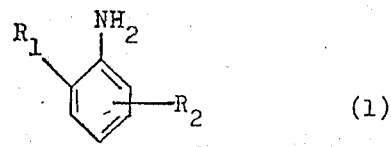

wherein $R_1$ and $R_2$ have the meaning indicated in columns I and II of the table below are coupled with the coupling components of the formula (2)

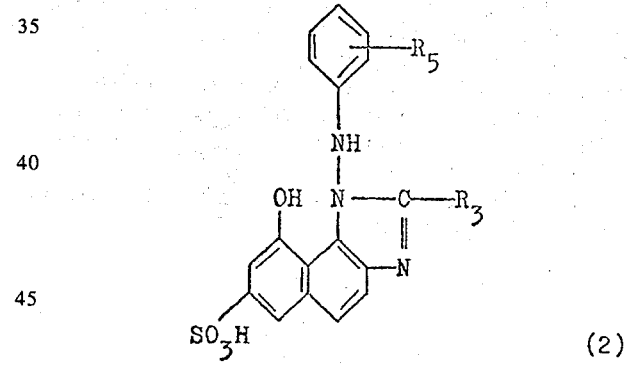

wherein $R_3$ and $R_5$ have the meaning indicated in column III and IV, dyestuffs are obtained which dye polyamide fibres and wool in the shades indicated in column V.

Table IV

| No. | (I) $R_1$ | (II) $R_2$ | (III) $R_3$ | (IV) $R_5$ | (V) Shade |
|-----|-----------|------------|-------------|------------|-----------|
| 1 | $SO_3H$ | 5-$NHCOCH_3$ | $CH_3$ | 4-$NO_2$ | Scarlet |
| 2 | " | " | " | 2-$NO_2$ | " |
| 3 | " | " | " | H | " |
| 4 | $SO_3H$ | 5-$NHCOCH_3$ | $CH_3$ | 2-$CH_3$ | Scarlet |
| 5 | " | 5-$NHCOC_6H_5$ | " | 2-$NO_2$ | " |
| 6 | " | " | " | 4-Cl | " |
| 7 | " | 5-$NHCOCH_3$ | " | " | " |
| 8 | " | " | " | 3-Cl | " |
| 9 | $OCH_3$ | H | " | 2-$SO_3H$ | Red |
| 10 | $CH_3$ | H | " | " | Scarlet |
| 11 | H | H | " | " | " |
| 12 | $SO_3H$ | 5-$NHCOC_6H_5$ | " | 2-$SO_2C_6H_5$ | " |
| 13 | " | " | " | 2-$SO_2OC_6H_5$ | " |
| 14 | " | " | " | 2—$SO_2N\begin{smallmatrix}CH_3\\C_6H_{11}\end{smallmatrix}$ | " |

EXAMPLE 7

12.7 parts of o-chloroaniline are dissolved in 350 parts of water and 30 parts by volume of 30% strength hydrochloric acid, the mixture is cooled to 0° – 5°C and 20 parts by volume of 5 N sodium nitrate solution are added. The resulting diazonium salt solution is added to 49.5 parts of 2-methyl-3-(4'-nitrophenylamino)9-hydroxy-3H-naphtho-(1,2-d)imidazole-4,7-disulphonic acid, dissolved in 500 parts of water and 40 parts of sodium carbonate. After completion of coupling, the mixture is heated to 50° – 60°C, sodium chloride is added and the product is filtered off and dried. The resulting dyestuff of the formula

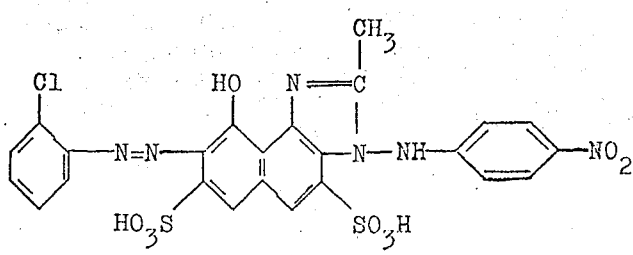

dyes wool and polyamide fibres in pure red shades.

To manufacture the 2-methyl-3-(4'-nitrophenylamino)-9-hydroxy-3H-naphtho(1,2-d)-imidazole-4,7-disulphonic acid used in this example, the dyestuff which is produced by acid coupling of diazotised p-nitroaniline with 1-amino-8-hydroxy-naphthalene-3,6-disulphonic acid is dissolved in water, the solution is acidified with hydrochloric acid and molar amounts, or an excess of acetaldehyde are added. Thereafter the whole is heated to 100°C for some hours and the product which has precipitated is filtered off. After washing with water, almost colourless crystals are obtained.

If, following the instructions of Example 7, the diazotised amines of the formula (1)

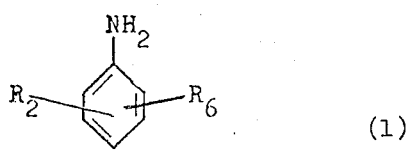

wherein $R_2$ and $R_6$ have the meanings indicated in column I and II of the table which follows, are coupled with the coupling components of the formula (2)

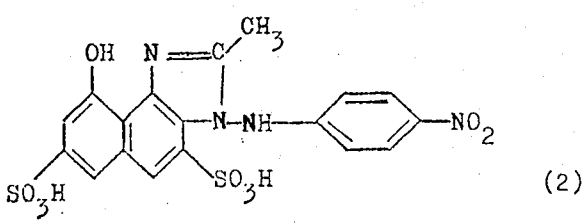

dyestuffs are obtained which dye polyamide fibres and wool in the shades indicated in column III.

Table V

| No. | (I) $R_2$ | (II) $R_6$ | (III) Shade |
|---|---|---|---|
| 1 | H | H | Scarlet |
| 2 | 2-SO$_2$—N—C$_6$H$_5$<br>    $\quad$ CH$_3$ | H | " |
| 3 | 2-SO$_2$OC$_6$H$_5$ | H | " |
| 4 | 3-Cl | 4-Cl | Scarlet |
| 5 | 2-OCH$_3$ | H | Red |
| 6 | 2-CH$_3$ | H | Scarlet |
| 7 | 2-NHCOCH$_3$ | H | Scarlet |
| 8 | 2-SO$_3$H | 5-NHCOCHBrCH$_2$Br | Scarlet |
| 9 | 2-SO$_2$OCH$_3$ | H | Red |
| 10 | 2-Cl | 4-COOCH$_3$ | " |
| 11 | 2-CN | 4-SO$_2$CH$_3$ | " |
| 12 | H | 5-CF$_3$ | " |
| 13 | 2-Br | H | " |
| 14 | 2-NO$_2$ | 4-SO$_2$C$_2$H$_4$OH | " |

If instead of the 49.5 parts of 2-methyl-3-(4'-nitrophenylamino)-9-hydroxy-3H-naphtho(1,2-d)imidazole-4,7-disulphonic acid employed in Example 7, 49.5 parts of 2-methyl-3-(4'-nitrophenylamino)-9-hydroxy-3H-naphtho(1,2-d)imidazole-5,7-disulphonic acid are used and in other respects the abovementioned instructions are followed, the dyestuff of the formula

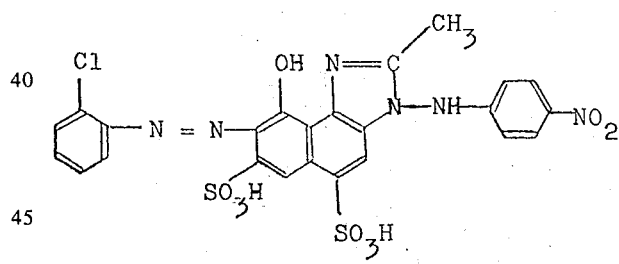

is obtained, which dyes polyamide fibres and wool in pure red shades.

EXAMPLE 8

23 parts of 5-acetylamino-aminobenzene-2-sulphonic acid are dissolved in 600 parts of water with addition of sodium carbonate, and after adding 20 parts by volume of a 5 N sodium nitrite solution, the solution is mixed with 40 parts by volume of 30% strength hydrochloric acid at 0° to 5°C. The diazonium compound thereby obtained is added to 42.5 parts of 1-(4'nitrophenylamino)-6-hydroxy-2-methyl-1H-naphtho(1,2-d)imidazole-8-sulphonic acid in 500 parts of water and the suspension is rendered alkaline with sodium carbonate. After completion of coupling the solution is heated and the dyestuff of the formula

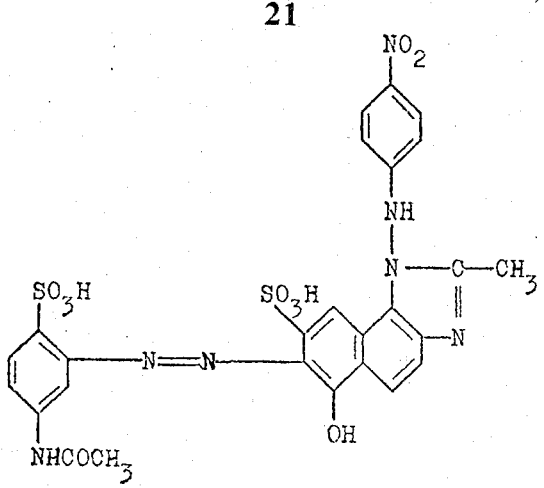

chloro-phenylamino)-9-hydroxy-2-methyl-1H-naphtho-(1,2-d)imidazole-7-sulphonic acid and saponifying the acetyl group) are dissolved in water and the solution is added to an ice-cooled aqueous suspension of 18.5 parts of cyanuric chloride. The reaction mixture is stirred at 5°–10°C and the liberated acid is neutralised by dropwise addition of a dilute sodium hydroxide solution. Thereafter a neutral solution of 17.3 parts of 4'-amino-benzenesulphonic acid is added to the dichlorotriazinyl dyestuff formed and the mixture is heated to 45°C, whilst keeping the pH value at between 6 and 7 by dropwise addition of dilute sodium hydroxide solution. After completion of the condensation the dyestuff is precipitated by adding sodium chloride and is filtered off and dried. The resulting dyestuff, of the formula

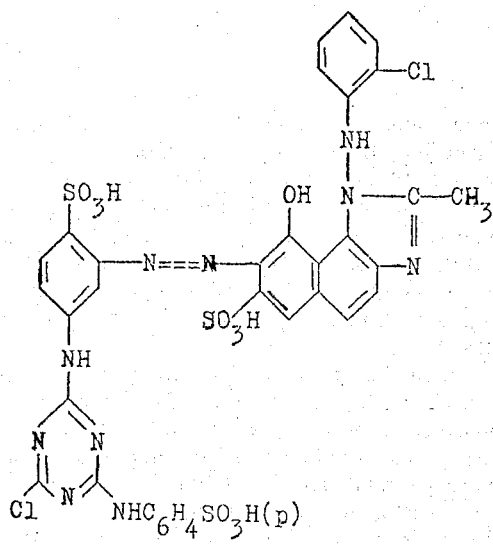

dyes cotton in pure red shades. If instead of 1-(2'-chlorophenylamino)-9-hydroxy-2-methyl-1H-naphtho(1,2-d)imidazole-7-sulphonic acid a corresponding amount of a 1-(2'-sulphophenylamino)-9-hydroxy-2-methyl-1H-naphtho(1,2-d)imidazole-7-sulphonic acid is used and in other respects the instructions of Example 9 are followed, a dyestuff with similar properties is obtained.

is precipitated by adding sodium chloride and filtered off. After drying, the dyestuff is a dark powder which dyes polyamide fibres and wool, from a bath containing acetic acid, in reddish-tinged orange shades having generally good fastness properties and very good fastness to light.

To manufacture the 1-(4'-nitro-phenylamino)-6-hydroxy-2-methyl-1H-naphtho(1,2-d)imidazole-8-sulphonic acid used in this example, the dyestuff which is produced by the acid coupling of diazotised p-nitroaniline with 2-amino-5-hydroxy-naphthalene-7-sulphonic acid is suspended in water or an alcohol-water mixture and the whole is acidified with hydrochloric acid and treated with a molar amount, or an excess, of acetaldehyde. Thereafter the mixture is heated to 80°–100°C for some hours and the product which has precipitated is filtered off, washed and dried. After reprecipitation from alcohol-water, colourless crystals are obtained.

If instead of 5-acetylamino-aminobenzene-2-sulphonic acid a corresponding amount of 4-acetylamino-, 4-benzoylamino- or 5-benzoylamino-aminobenzene-2-sulphonic acid is used and in other respects the instructions of Example 8 are followed, dyestuffs with similar properties are obtained, which dye polyamide fibres and wool in reddish-tinged orange shades or scarlet shades.

EXAMPLE 9

60.3 parts of the dyestuff of the formula

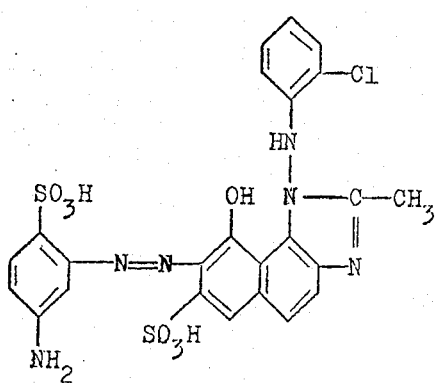

(manufactured by coupling diazotised 1-amino-5-acetylaminobenzene-2-sulphonic acid with 1-(2'-

EXAMPLE 10

23 parts of 5-acetylamino-aminobenzene-2-sulphonic acid are dissolved in 600 parts of water with addition of sodium carbonate, and after adding 20 parts by volume of a 5 N sodium nitrite solution, the solution is treated with 40 parts by volume of 30% strength hydrochloric acid at 0°C to 5°C.

The resulting diazonium suspension is added dropwise to 50 parts of 1-(4'-nitrophenylamino)-9-hydroxy-2-methyl-1H-naphtho(1,2-d)imidazole-7-sulphonic acid N-methylanilide which is dissolved in 500 parts by volume of ethylene glycol monomethyl ether and 500 parts by volume of acetone with the addition of 20 parts of sodium carbonate in a small amount of water, and the whole is rendered alkaline with 60 parts by volume of 2 N sodium carbonate solution. Thereafter the mixture is stirred for a further hour and the dyestuff of the formula

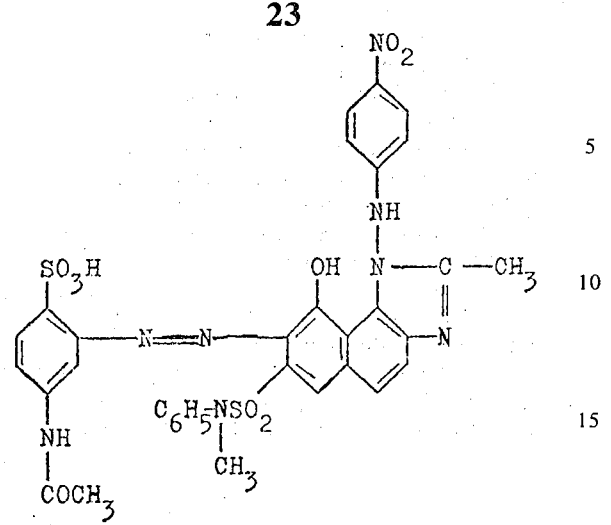

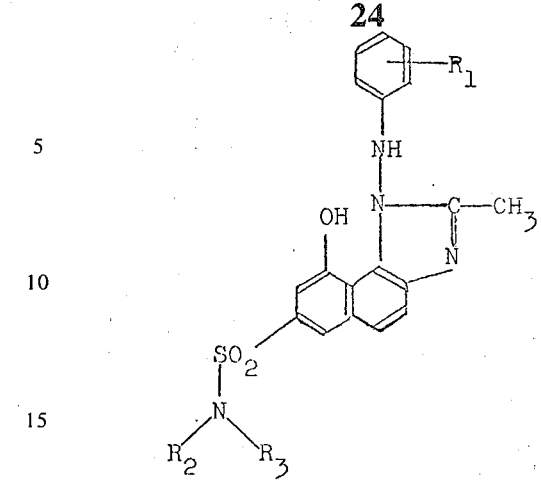

wherein $R_1$, $R_2$ and $R_3$ have the meanings indicated in column II, III and IV, dyestuffs are obtained which dye wool and polyamide fibres in the shades indicated in column V.

Table 6

| I<br>R | II<br>$R_1$ | III<br>$R_2$ | IV<br>$R_3$ | V<br>Shade |
|---|---|---|---|---|
| 4-NHCOCH₃ | p-NO₂ | CH₃ | C₆H₅ | Red |
| H | p-NO₂ | CH₃ | C₆H₅ | Scarlet |
| 5-NHCOCH₃ | O—Cl | CH₃ | C₆H₅ | " |
| " | p-NO₂ | C₂H₅ | H | " |
| " | O—Cl | C₂H₅ | H | " |
| " | p-NO₂ | C₂H₅ | C₂H₅ | " |
| " | O—Cl | C₂H₅ | C₂H₅ | " |
| " | p-NO₂ | CH₂CH₂CH₂OCH₃ | H | " |
| " | O—Cl | CH₂CH₂CH₂OCH₃ | H | " |
| " | p-NO₂ | H | H | " |
| " | O—Cl | H | H | " | is precipitated with hydrochloric acid and filtered off. After drying, the dyestuff is a dark powder which dyes polyamide fibres and wool in pure red shades.

Instead of the 5-acetylamino-aminobenzene-2-sulphonic acid mentioned in this example, it is also possible to use 23 parts of 4-acetylamino-aminobenzene-2-sulphonic acid or 17.3 parts of aminobenzene-2-sulphonic acid, and dyestuffs with similar properties are obtained.

To manufacture the 1-(4'-nitrophenylamino)-9-hydroxy-2-methyl-1H-naphtho(1,2-d)imidazole-7-sulphonic acid N-methylanilide, the dyestuff which is produced by acid coupling of p-nitroaniline with 2-amino-8-hydroxy-naphthalene-6-sulphonic acid N-methylanilide is suspended in 80% strength acetic acid, molar amounts, or an excess, of acetaldehyde are added and the mixture is heated to 100°C for some hours. Thereafter it is diluted with water and the product which has precipitated is filtered off. After recrystallisation from ethylene glycol monomethyl ether, colourless crystals are obtained.

If, following the instructions of Example 10, amines of the formula (I)

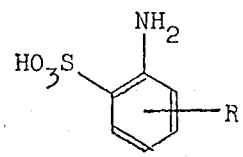
(I)

wherein R has the meanings indicated in column I of the table which follows, are coupled with the coupling components of the formula (2)

EXAMPLE 11

12.8 parts of o-chloroaniline are dissolved in 500 parts of water with the addition of 25 parts by volume of 30% strength hydrochloric acid, 25 parts by volume of 4 N sodium nitrite solution are added at 0°C and after 15 minutes 15% strength sodium carbonate solution is added until the mixture is alkaline to Congo Violet. The diazonium solution thereby obtained is added to 51.5 parts of 1-(2'-chlorophenylamino)-9-hydroxy-2-methyl-1H-naphtho(1,2-d)imidazole-7-(γ-dimethylaminopropyl)sulphamide in 300 parts of water and 300 parts of ethanol, 50 parts by volume of 2 N sodium hydroxide solution and 70 parts by volume of 15% strength sodium carbonate solution also being added, and the dyestuff which precipitates is filtered off and dried. Thereafter, 50 parts of the abovementioned dyestuff are suspended in 1,000 parts of water and 250 parts of ethanol and 16 parts by volume of dimethyl sulphate are added at room temperature, whilst stirring and maintaining the pH value at 7 by means of sodium hydroxide solution. After completion of the reaction, the dyestuff of the formula

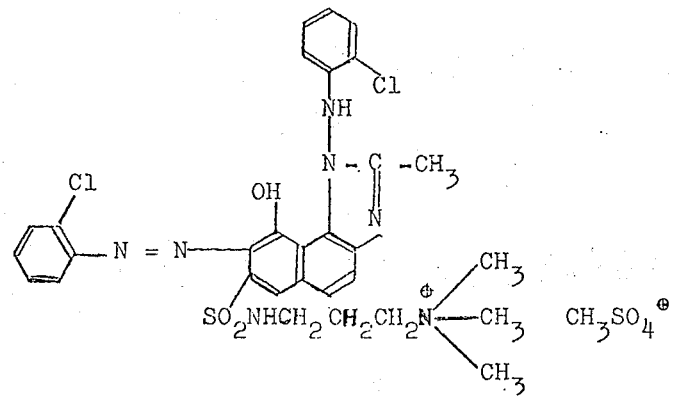

is precipitated by adding sodium chloride and filtered off. It is a dark powder which dyes polyacrylonitrile fibres in red shades.

EXAMPLE 12

17 parts of 4-chloroacetyl-aminobenzene are dissolved in 250 parts by volume of 1N hydrochloric acid whilst warming and the solution is then cooled to 20°C and diazotised with 100 parts by volume 1 N sodium nitrite solution. The diazonium compound thereby obtained is added, at 0° –5°C, to 45 parts of 1-(4'-nitrophenylamino)-9-hydroxy-2-methyl— H-naphtho(1,2-d)imidazole-7-(N-diethyl)-sulphamide in 250 parts of ethanol, whilst also adding 250 parts by volume of 2 N sodium hydroxide solution and the dyestuff formed is filtered off and dried.

54 parts of the abovementioned dyestuff are stirred with 40 parts by volume of 40% strength triethylamine for 20 hours at 30°C, the mixture is filtered and the resulting paste is boiled for 5 minutes in 4,000 parts by volume of water and 200 parts by volume 1 N hydrochloric acid, the whole is concentrated to 1,500 parts by volume and the dyestuff of the formula

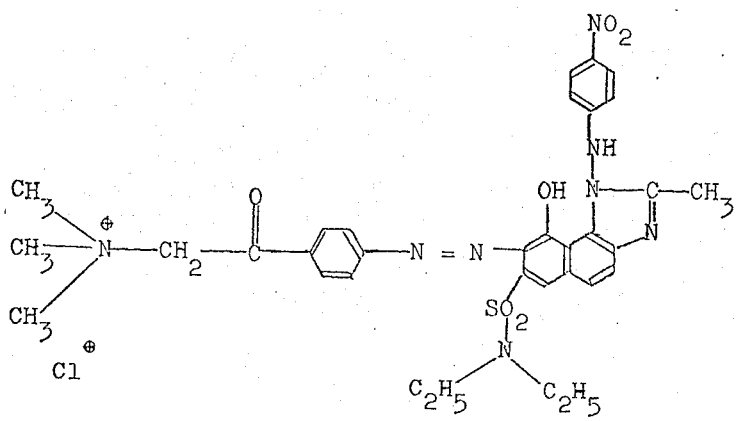

is precipitated by adding sodium chloride. After drying, the dyestuff is a dark powder which dyes polyacrylonitrile fibres in red shades.

EXAMPLE 13

14.6 parts of 2-amino-4-chloro-1-methoxybenzene are dissolved in 500 parts of hot water with addition of 30 parts by volume of 30% strength hydrochloric acid, and the mixture is again cooled to 0°C and diazotised with 25 parts by volume of 4 N sodium nitrite solution. The diazonium compound thereby obtained is added to 45 parts of 1-(4'-nitrophenylamino)-9-hydroxy-2-methyl-1H-naphtho(1,2-d)imidazole-7-(N-diethyl)-sulphamide in 500 parts of water and 500 parts of ethanol and the pH value is kept at between 9 and 9.5 with 2 N sodium hydroxide solution. After completion of coupling, the dyestuff of the formula

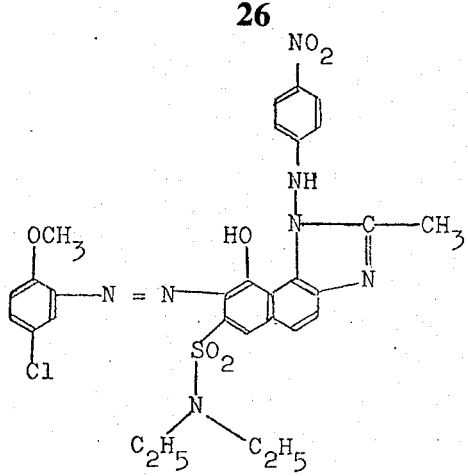

is filtered off; it dyes polyester fibres, by the thermosol process, in red shades.

EXAMPLE 14

If instead of the 23 parts of 5-acetylamino-aminobenzene 2-sulphonic acid employed in Example 1 29 parts of 5-benzoylaminoaminobenzene-2-sulphonic acid are used, and instead of the 42.5 parts of 1-(2'-chlorophenylamino)-9-hydroxy-2-methyl-1H-naphtho(1,2-d)imidazole-7-sulphonic acid 50.8 parts of 1-(2'-chlorophenylamino)-9-hydroxy-2-methyl-1H-naphtho(1,2-d)imidazole-4,7-disulphonic acid are used, and in other respects the instructions indicated are followed, the dyestuff of the formula

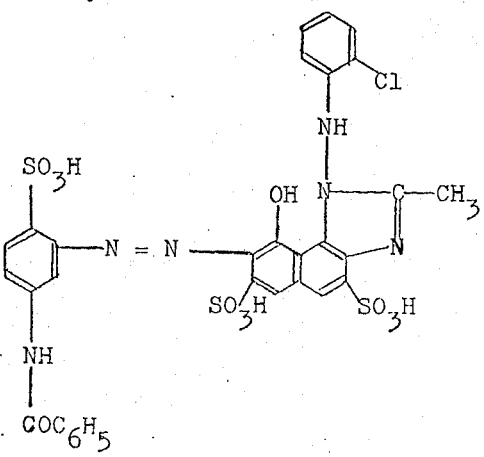

is obtained, which dyes wool and polyamide fibres in red shades.

EXAMPLE 15

If instead of the 23 parts of 5-acetylamino-aminobenzene-2-sulphonic acid mentioned in Example 1 29 parts of 5-benzoylaminoaminobenzene-2-sulphonic acid are used and instead of the 42.5 parts of 1-(2'-chlorophenylamino)-9-hydroxy-2-methyl-1H-naphtho(1,2-d)imidazole-7-sulphonic acid 43.1 parts of 2-methyl-3-(4'4'-nitrophenylamino)-9-hydroxy-3H-naphtho(1,2-d)imidazole-5-sulphonic acid are used, and in other respects the instructions mentioned are followed, the dyestuff of the formula

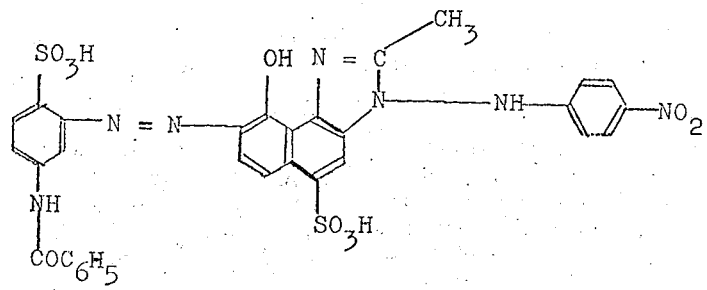

is obtained, which dyes polyamide fibres in red shades.

EXAMPLE 16

20.3 parts of 4-amino-antipyrine are dissolved in 1,000 parts of water with the addition of 40 parts of 30% strength hydrochloric acid and 25 parts of 4 N sodium nitrite solution are added at 0°C. The diazonium compound thereby obtained is added to 42.5 parts of 1-(2'-chlorophenylamino)-9-hydroxy-2-methyl-1H-naphtho(1,2-d)imidazole-7-sulphonic acid in 500 parts of water and the suspension is rendered alkaline with sodium carbonate solution. After completion of coupling the dyestuff of the formula

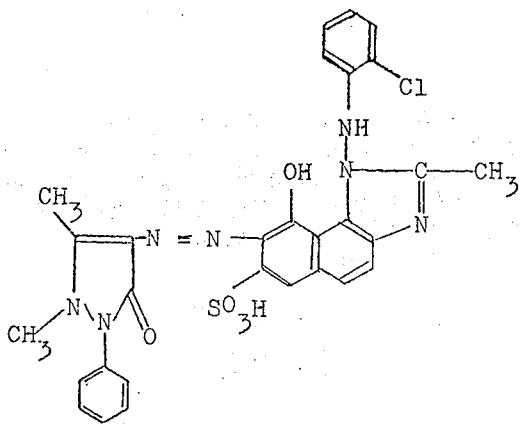

is filtered off.

After drying, the dyestuff is a dark powder which dyes polyamide fibres and wool in red shades.

If instead of the 20.3 parts of 4-amino-antipyrine mentioned in Example 16 14.4 parts of 8-aminoquinoline are used and in other respects the instructions mentioned are followed, the dyestuff of the formula

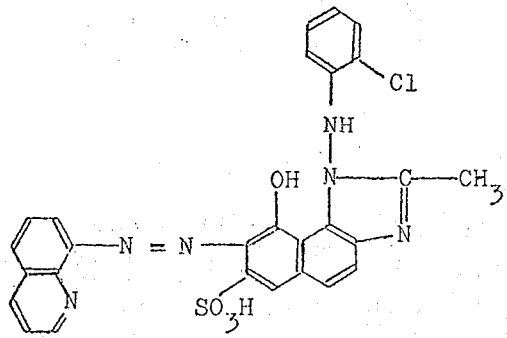

is obtained, which dyes polyamide fibres and wool in red shades.

EXAMPLE 17

If instead of the 40.3 parts of 1-(2'-chlorophenylamino)-9-hydroxy-2-methyl-1H-naphtho(1,2-d)imidazole-7-sulphonic acid mentioned in Example 2 71 parts of 1-(2'-sulpho-4'-dibromopropion-yl-aminophenylamino)-9-hydroxy-2-methyl-1H-naphtho (1,2-d)imidazole-6-sulphonic acid are used and in other respects the instructions mentioned are followed, the dyestuff of the formula

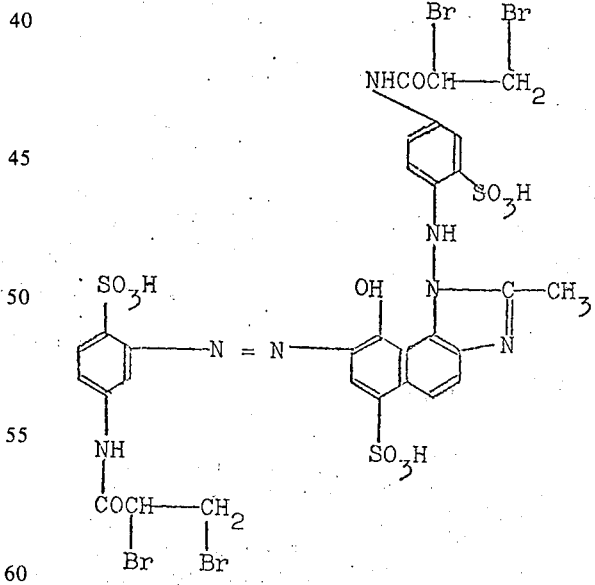

is obtained, which dyes wool in pure red shades of good fastness properties.

DYEING EXAMPLE

Two parts of the dyestuff obtainable according to Example 2 are dissolved in 4,000 parts of water, 10 parts of crystalline sodium sulphate are added and 100 parts of the well wetted wool are introduced into the resulting dye bath at 40° to 50°C. Thereafter, 2 parts of 40% strength acetic acid are added, the mixture is heated to the boil over the course of half an hour and dyeing is carried out at the boil for three quarters of an hour. Finally, the wool is rinsed with cold water and dried. The wool is dyed in wash-fast red shades of good fastness to light.

We claim:

1. A 1H- or 3H-naphtho-(1,2-d)imidazole dyestuff of the formula

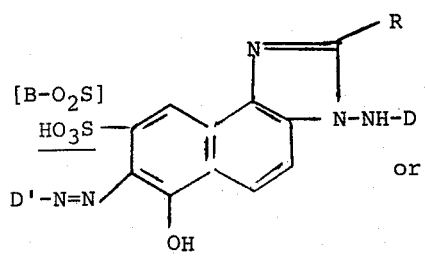

wherein D and D' are each independently phenyl or phenyl substituted by chloro, bromo, nitro, cyano, methylsulphonyl, carboethoxy, carbomethoxy, methyl, trifluoromethyl, β-hydroxyethylsulphonyl, β-chloroethylsulphonyl, carbocyclohexyloxy, sulphonamido, N-alkyl or N-di-alkyl sulphonamido in which alkyl contains 1–4 carbon atoms, N-oxy- or N,N-dioxy-lower alkyl sulphonamido in which alkyl contains 1 to 3 carbon atoms, N-ethyl-N-phenylsulphonamido, N-methyl-N-cyclohexyl sulphonamido, N-phenylmethyl sulphonamido or N,β-methoxyethylsulphonamido or a group of the formula

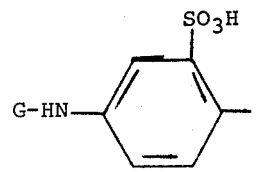 or 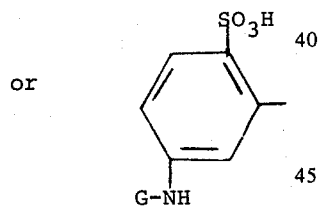

wherein G is acetyl, propionyl, isopropionyl, benzoyl, chloro-, bromo- or nitro- substituted benzoyl, α-chloroacetyl, acryloyl, α-chloro- or bromacryloyl or α,β-dichloro- or dibromopropionyl;

R is alkyl having 1 to 6 carbon atoms, phenyl or phenyl substituted by nitro, sulpho, carboxy, hydroxy, chloro, methoxy, methyl, dimethylamino or a group of the formula

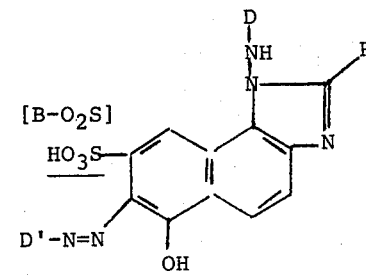

wherein G has the meanings indicated above.

2. A 3H-naphtho-(1,2-d)-imidazole dyestuff according to claim 1, of the formula

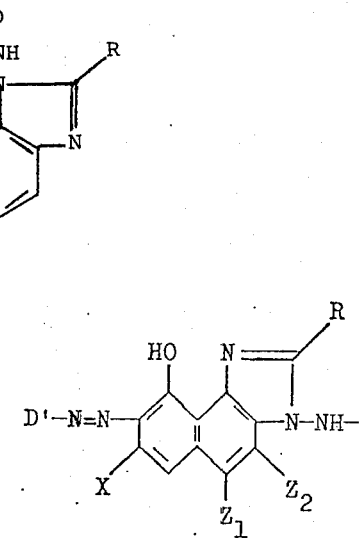

wherein either X and $Z_1$ or X and $Z_2$ or only $Z_1$ represent a $HO_3S-$ group and wherein D, D' and R have the abovementioned meaning.

3. A 1H-naphtho-(1,2-d)-imidazole dyestuff according to claim 1 of the formula

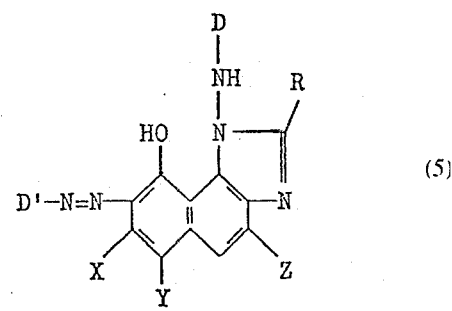

wherein either X and Z or only X or Y represent a $HO_3S-$ group and wherein D, D' and R have the abovementioned meaning.

* * * * *

UNITED STATES PATENT AND TRADEMARK OFFICE
CERTIFICATE OF CORRECTION

PATENT NO. : 3,925,348
DATED : December 9, 1975
INVENTOR(S) : WOHLKONIG ET AL.

It is certified that error appears in the above–identified patent and that said Letters Patent are hereby corrected as shown below:

In Claim 1, in the structural formula, in both instances, [B-O$_2$S] should be deleted.

In claim 1, in the structural formula, in both instances, HO$_3$S should not be underlined.

Signed and Sealed this second Day of March 1976

[SEAL]

Attest:

RUTH C. MASON
*Attesting Officer*

C. MARSHALL DANN
*Commissioner of Patents and Trademarks*